E. W. HOFSTATTER.
EAR TRUMPET FOR TRUCK DRIVERS.
APPLICATION FILED OCT. 14, 1920.
1,423,802.
Patented July 25, 1922.
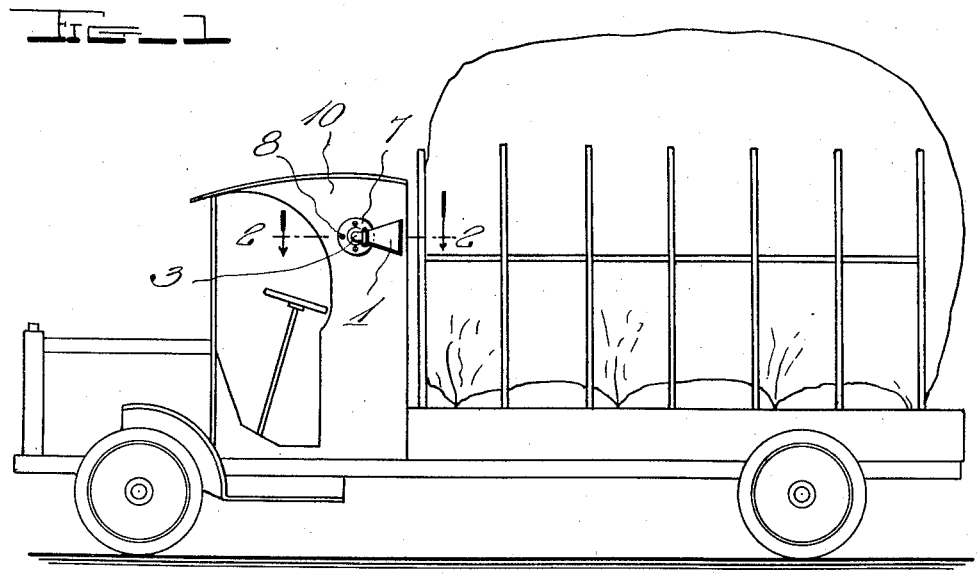
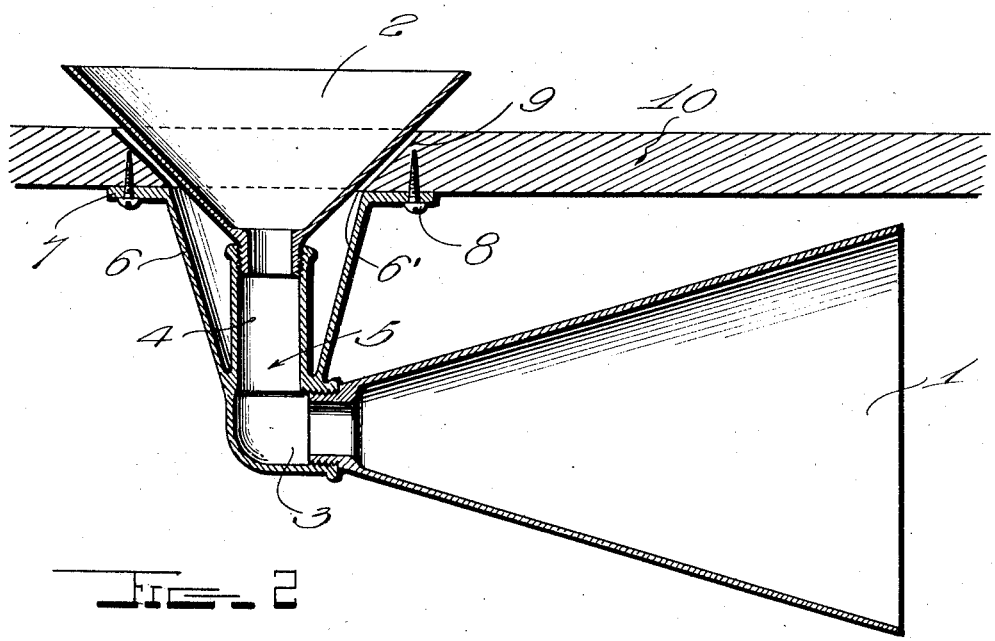
Witness
Inventor
E. W. Hofstatter
By H. B. Wilson & Co.
Attorneys

UNITED STATES PATENT OFFICE.

ERNEST W. HOFSTATTER, OF NYACK, NEW YORK.

EAR TRUMPET FOR TRUCK DRIVERS.

1,423,802. Specification of Letters Patent. Patented July 25, 1922.

Application filed October 14, 1920. Serial No. 416,823.

*To all whom it may concern:*

Be it known that I, ERNEST W. HOFSTATTER, a citizen of the United States, residing at Nyack, in the county of Rockland and State of New York, have invented certain new and useful Improvements in Ear Trumpets for Truck Drivers; and I do declare the following to be a full, clear, and exact description of the invention, such as will enable others skilled in the art to which it appertains to make and use the same.

My invention has for its object to provide an extremely simple and inexpensive, yet a highly efficient and reliable device for attachment to motor trucks in such a manner that the drivers thereof may readily hear the signals of automobiles approaching from the rear, so that they may pull to one side of the road to allow the other machines to pass. A great deal of road obstructing has heretofore taken place due to the fact that motor truck drivers cannot hear the signals of machines behind them, due to the noise incident to the running of their machines. By my invention, however, such difficulties are overcome and there is no excuse for a truck driver continually occupying the middle of the road.

With the foregoing in view, the invention resides in the novel construction of the device as hereinafter fully described and claimed, the descriptive matter being supplemented by the accompanying drawings.

Figure 1 is a side elevation of a motor truck showing the application of my invention thereto.

Figure 2 is a horizontal sectional view on an enlarged scale, taken on line 2—2 of Fig. 1.

In carrying out my invention, I employ a sound receiving horn 1, a sound emitting horn 2 communicating therewith, and means for attaching these horns to a motor truck in such a manner that the receiving horn 1 will open rearwardly while the emitting horn 2 is directed toward the truck driver's head. By this arrangement, the horn 1 collects the sound waves from the signals of vehicles approaching from the rear and these waves are expelled from the horn 2 in such a manner as to permit the truck driver to readily hear them above the noise of his machine.

In the preferred embodiment of my invention, the horns 1 and 2 are threaded into the relatively short and long arms 3 and 4 respectively, of a hollow elbow 5 and means are provided for securing this elbow to the cab or to any other appropriate part of a motor truck. In most instances, I prefer to employ a hollow conical support 6 having an attaching flange 7 at its larger end to be secured by screws or the like 8 to the truck, while the longer arm 4 of the elbow 5 passes into said support through its small end and is by preference formed integrally therewith. The arm 4 is of less length than the support 6 and the contracted inner end of the horn 2 extends into the larger end of said support for connection with said arm 4, a slight space 6' being left between the horn and support in order that no rattling can take place.

When installing the device, a suitable opening 9 is cut in the cab 10 if such a cab is used, and the device is secured in place as shown in Fig. 2, with the major portion of the horn 2 located in the opening 9 and the support 6 so that there is little danger of the driver injuring his head against said horn. If the truck is not provided with a cab 10, the device may of course be supported by any other preferred part of the machine or by a separate bracket or the like for this purpose. Regardless of the exact manner of installation, the device will be highly efficient and render the signals of automobiles approaching from the rear, readily audible to the truck driver, so that there is no reason why he should not turn out of the highway and permit other vehicles to pass.

Since probably the best results may be obtained from the details disclosed, such details may well be followed, but within the scope of the invention as claimed, numerous minor changes may well be made.

I claim:

1. An ear trumpet for truck drivers comprising a sound receiving horn, a sound emitting horn, a hollow elbow to whose ends said horns are secured with their discharge ends at right angles to each other, and means carried by said elbow for attaching the entire device to a motor truck with said receiving horn opening rearwardly outside of the truck and said emitting horn opening toward one of the driver's ears.

2. An ear trumpet for truck drivers comprising a hollow conical support having an outstanding attaching flange on its larger end, an elbow integral with the smaller end of said support, one end of said elbow extending into said support, a sound emitting horn extending into the larger end of said support and connected with said one end of said elbow, and a sound receiving horn connected to the other end of said elbow.

In testimony whereof I have hereunto set my hand.

ERNEST W. HOFSTATTER.